US008466574B2

(12) United States Patent
Bear et al.

(10) Patent No.: US 8,466,574 B2
(45) Date of Patent: Jun. 18, 2013

(54) TORQUE NEUTRALIZING TURBINE MOORING SYSTEM

(76) Inventors: Clayton Bear, Calgary (CA); Craig Wessner, Calgary (CA); Vincent Joseph Ginter, Calgary (CA)

( * ) Notice: Subject to any disclaimer, the term of this patent is extended or adjusted under 35 U.S.C. 154(b) by 657 days.

(21) Appl. No.: 12/503,144

(22) Filed: Jul. 15, 2009

(65) Prior Publication Data
US 2010/0176595 A1 Jul. 15, 2010

Related U.S. Application Data

(60) Provisional application No. 61/081,188, filed on Jul. 16, 2008.

(51) Int. Cl.
F03B 13/10 (2006.01)
F03B 13/12 (2006.01)
H02P 9/04 (2006.01)
F03B 13/00 (2006.01)

(52) U.S. Cl.
USPC .............................................. 290/53; 290/54

(58) Field of Classification Search
USPC ..................................... 290/53, 54
See application file for complete search history.

(56) References Cited

U.S. PATENT DOCUMENTS

| | | | | | |
|---|---|---|---|---|---|
| 3,912,938 | A | * | 10/1975 | Filipenco | 290/53 |
| 4,172,689 | A | * | 10/1979 | Thorsheim | 415/7 |
| 4,249,084 | A | * | 2/1981 | Villanueva et al. | 290/53 |
| 4,539,485 | A | * | 9/1985 | Neuenschwander | 290/53 |
| 4,598,210 | A | * | 7/1986 | Biscomb | 290/43 |
| 4,781,023 | A | * | 11/1988 | Gordon | 60/506 |
| 4,851,704 | A | * | 7/1989 | Rubi | 290/53 |
| 6,294,844 | B1 | * | 9/2001 | Lagerwey | 290/55 |
| 6,647,716 | B2 | * | 11/2003 | Boyd | 60/398 |
| 7,105,942 | B2 | * | 9/2006 | Henriksen | 290/55 |
| 7,397,144 | B1 | * | 7/2008 | Brostmeyer et al. | 290/53 |
| 7,441,988 | B2 | * | 10/2008 | Manchester | 405/75 |
| 7,566,983 | B1 | * | 7/2009 | Lyatkher | 290/54 |
| 7,750,492 | B1 | * | 7/2010 | Ryznic et al. | 290/54 |
| 7,886,680 | B2 | * | 2/2011 | Draper | 114/293 |
| 7,893,556 | B1 | * | 2/2011 | Ryznic et al. | 290/55 |
| 2002/0157398 | A1 | * | 10/2002 | Boyd | 60/721 |
| 2005/0236841 | A1 | * | 10/2005 | Henriksen | 290/54 |
| 2006/0222461 | A1 | * | 10/2006 | Manchester | 405/75 |
| 2006/0232075 | A1 | * | 10/2006 | Fraenkel | 290/54 |
| 2007/0292259 | A1 | * | 12/2007 | Choie | 415/8 |
| 2008/0240864 | A1 | * | 10/2008 | Belinsky | 405/223.1 |
| 2009/0058090 | A1 | * | 3/2009 | Henriksen | 290/53 |
| 2010/0230971 | A1 | * | 9/2010 | Mackie | 290/54 |
| 2010/0320766 | A1 | * | 12/2010 | Klukowski | 290/53 |
| 2011/0037264 | A1 | * | 2/2011 | Roddier et al. | 290/44 |
| 2011/0068579 | A1 | * | 3/2011 | Dullaway | 290/53 |
| 2011/0107953 | A1 | * | 5/2011 | Jahnig | 114/264 |
| 2011/0215650 | A1 | * | 9/2011 | Slocum et al. | 307/72 |
| 2012/0187693 | A1 | * | 7/2012 | Houvener et al. | 290/54 |

FOREIGN PATENT DOCUMENTS

WO WO 2010006431 A1 * 1/2010

* cited by examiner

*Primary Examiner* — Pedro J Cuevas
(74) *Attorney, Agent, or Firm* — Tai W. Nahm

(57) ABSTRACT

The present invention is a floating platform capable of supporting a turbine assembly. The platform and turbine assembly may be configured so as to resist drag. Drag may be absorbed by holding members attached to the present invention above and below the moment center. Furthermore a pivoting cable may be incorporated in the turbine assembly whereby the turbine assembly is moveable and thereby able to absorb drag that is exercised upon a non-moveable rigidly positioned turbine as excessive torque on the turbine rotors. The turbine assembly is further pivotable between vertical (working) and horizontal (transportable) positions.

20 Claims, 13 Drawing Sheets

TORQUE NEUTRALIZING TURBINE MOORING SYSTEM

FIELD OF INVENTION

This invention relates in general to the field of a platform assembly for turbines and more particularly to a floating platform wherein a turbine may be moored.

BACKGROUND OF THE INVENTION

Water turbines are a growing trend as the flow of water is increasingly looked to as a natural resource from which electrical power may be harnessed. There are several means of positioning turbines in water flow, including tidal flow, wave flows and current flows. A particularly popular means of positioning a turbine in a current flow is to position the turbine upon a floating platform.

The present invention overcomes the flaws inherent in the prior art of floating platforms supporting turbines in water flows. Previous innovations in the field of floating platforms for turbines are affected by drag. Drag generally arises from two aspects of prior art platforms. First, most prior art platforms are rigidly moored so as to cause the platform to remain as stationary as possible in flowing water. This positioning creates drag upon the elements of the platform that are in the water. For example, the flow of the water exerts excess torque on rotor that creates drag. This occurs because the rotor is virtually stationary in a flow of water. Second, drag is experienced by the platform as it sits in the water. The platform struggles to hold its position in the water as the turbine is functioning and as a result of this activity areas of the platform may be pulled under the water, which creates drag. It furthermore causes the platform surface to be un-level and the platform as a whole to be unstable.

An example of the prior art is disclosed in U.S. Pat. No. 4,940,387. The invention disclosed therein includes a structure, such as a barrage, utilized to position a water turbine in the path of a water source. The structure extends across and above the level of the water source and the turbine is mounted within a casing situated under the water level that extends downwards as a segment of the structure. The structure is supported from below, for instance by a piling.

US Patent Application No. 2003/0014969 discloses another configuration of a platform. An apparatus comprising two spaced, parallel, hollow side members is applied in this prior art example. The side members are formed to have inwardly facing sloping end faces, to allow the upstream end of the body to divert water into the channel between the side members. Turbine rotors are attached to the water facing side of cross bars positioned to extend between the side members. The platform is anchored by lines attached to each corner of the structure.

These prior art examples are configured in a manner that leaves them susceptible to experience drag. The means of anchoring the platforms can cause an instability whereby the platforms are un-level and drag pulls a portion of the platform underwater. Additionally strict positioning of the turbine from the platform creates drag upon the turbine rotor. Furthermore, the structures do not allow for easy transfer between locations. An invention is needed that overcomes these problems inherent in the prior art.

SUMMARY OF THE INVENTION

The present disclosure relates to a floatable turbine system intended for power generation comprising: (a) a turbine mounting assembly for holding a turbine for generating power from water flow; (b) a floatable platform for supporting said turbine mounting assembly; and (c) at least four holding members for attaching the turbine mounting assembly in a manner that resists water drag on the floatable platform.

Thus, in one aspect, the present invention provides for a floatable turbine system, characterized in that said floatable turbine system comprises: a floating platform supporting a turbine mounting assembly in water that is moveable within a pivoting cradle; and at least four holding members for attaching the turbine mounting assembly both above and below a moment center below the water.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
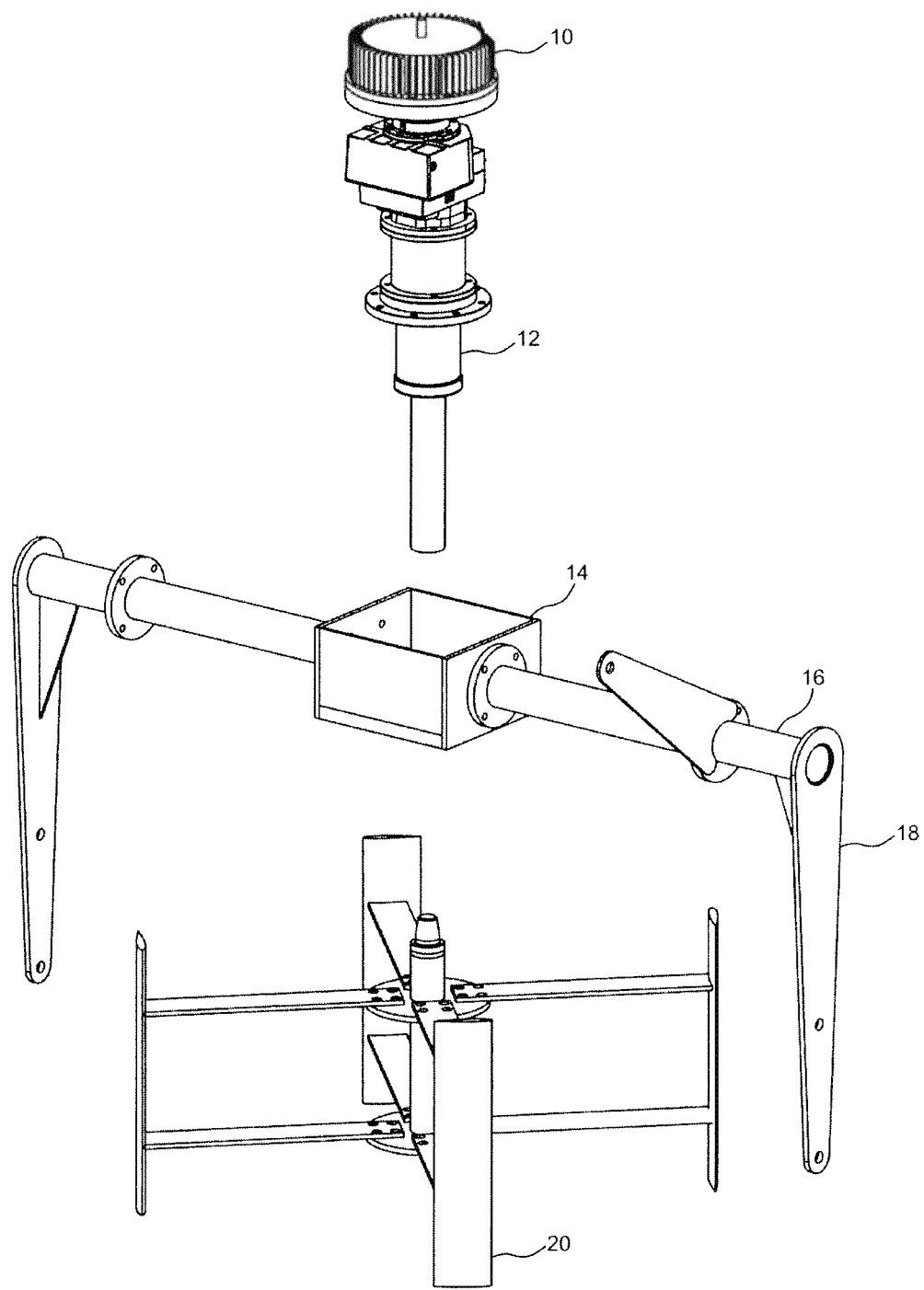
FIG. 1 is an exploded view of the pivoting assembly.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention relates to a floatable turbine system intended for power generation that comprises a floating platform supporting a turbine mounting assembly in water that is moveable within a pivoting cradle; and at least four holding members for attaching the turbine mounting assembly in a manner that resists water drag on the floatable platform. In one aspect of the present invention, the at least four holding members are attached to opposite sides of the turbine mounting assembly both above and below a moment center below the water.

The platform and turbine mounting assembly of the present invention are configured so as to resist drag. In particular the cables that cause the platform to remain in a specific position within the flow of water are attached so as to absorb drag. This has the effect that limited drag created by the rotor in the water is transferred to the floating platform. Significant drag upon the floating platform can pull portions of it underneath the water, but in the present invention drag is absorbed by the cables instead. Thus the floating platform may remain virtually level. The cable configuration may include at least two cables attached to each side of the turbine assembly, positioned to connect to the invention above and below the moment center. The moment center is equivalent to the drag center.

Additionally, drag caused by the force of water upon the submerged rotor may be diminished through the pivoting mounting of the turbine to the floatable platform. The turbine may be mounted to the turbine mounting assembly in a manner that is pivotable and therefore is not rigidly held. This may permit some movement by the turbine. This in turn may lessen the torque on the rotor exerted by the water flow. The outcome may be a more efficient function of the rotor in the water as it exerts less energy fighting the torque and consequently it is able to create more electrical energy.

The configuration of the present invention has several benefits. The floating platform need only support the weight of the turbine mounting assembly and the turbine itself and is not required to supply extra buoyancy to compensate for drag. Consequently the floating platform may be relatively small and therefore is more economical to build. Additionally the smaller size of the floating platform may cause it to be easy to transport the present invention. The turbine mounting assembly may be pivoted into a horizontal transport position, which further aids the transportability of the present invention both in the water and on land.

The present invention may have numerous embodiments. The embodiments generally involve turbine elements capable of generating electricity from the flow of water, whether this be by way of waves, tidal flow or current flow.

One embodiment includes a turbine mounting assembly for pivotally mounting a turbine as shown in FIG. 1. The turbine mounting assembly comprises a pivoting cradle 14 that permits movement and pivoting of the turbine. The turbine mounting assembly further comprises an upper arm 16 and two lower arms 18 extending from opposite ends of the upper arm. The turbine includes a generator 10 attached to a drive train 12. When the generator and drive train are assembled, they are inserted into the pivoting cradle 14 from which the upper arm 16 extends on either side thereof, each upper arm 16 having the lower arm 18 extending in a vertical direction therefrom that reaches below the moment center.

The assembled generator 10 and drive train 12, when inserted through the cradle 14, may be attached to a turbine rotor 20 positioned on the opposite side of the pivoting cradle to the generator/drive train assembly. Through this connection the generator/drive train assembly may be utilized to generate power from the movement of the rotor 20 in the water flow. In this embodiment the pivoting cradle 14 supports the generator 10/drive train 12 in a manner that permits for some movement of the rotor 20 and the generator/drive train assembly that it is connected to, whereby the rotor 20 is not positioned in rigid manner, but in a manner that permits movement.

Figure 2:
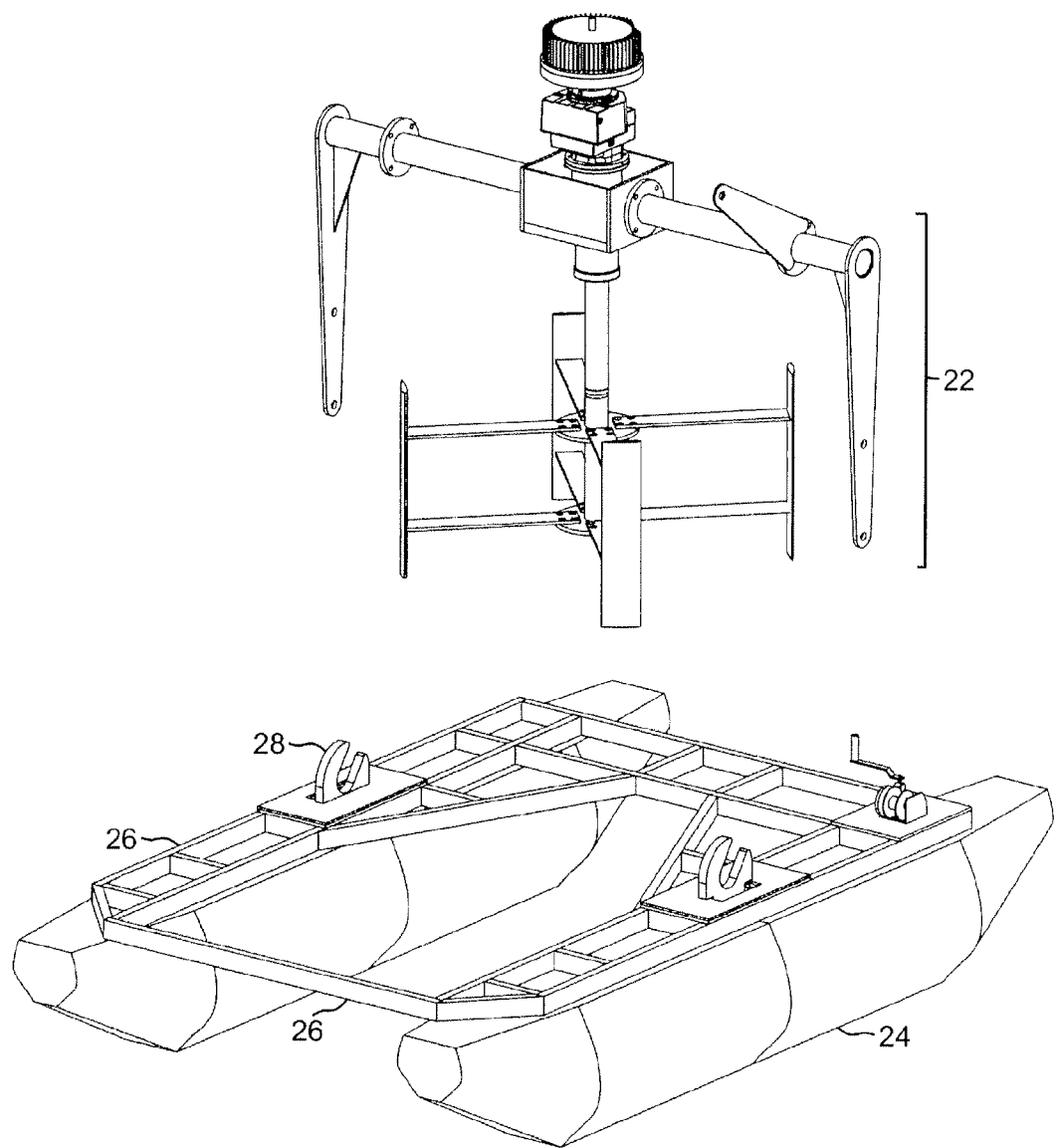
FIG. 2 is an exploded view of the floating turbine assembly.

As shown in FIG. 2 the pivoting turbine mounting assembly may be supported by a floating platform. A skilled reader will recognize that the platform may have a variety of configurations, but generally may include buoyancy means 24 positioned below a support structure 26 whereby the turbine assembly is supported upon the platform. In one embodiment of the present invention the support structure 26 may include an attachment means 28, whereby turbine assembly 22 may be held upon the support structure and thereby attached to the floating platform generally. As shown in FIG. 2 the attachment means 28 may have a slot therein and be attached to the support structure 26 whereby the upper arms 16 of the turbine mounting assembly may be held in a particular position upon the support structure in a detachable means. The turbine mounting assembly 22 is shown in a supported position in FIG. 3. A skilled reader will recognize that other attachment means may be applied to support the turbine assembly 22 upon the floating platform.

Figure 3:
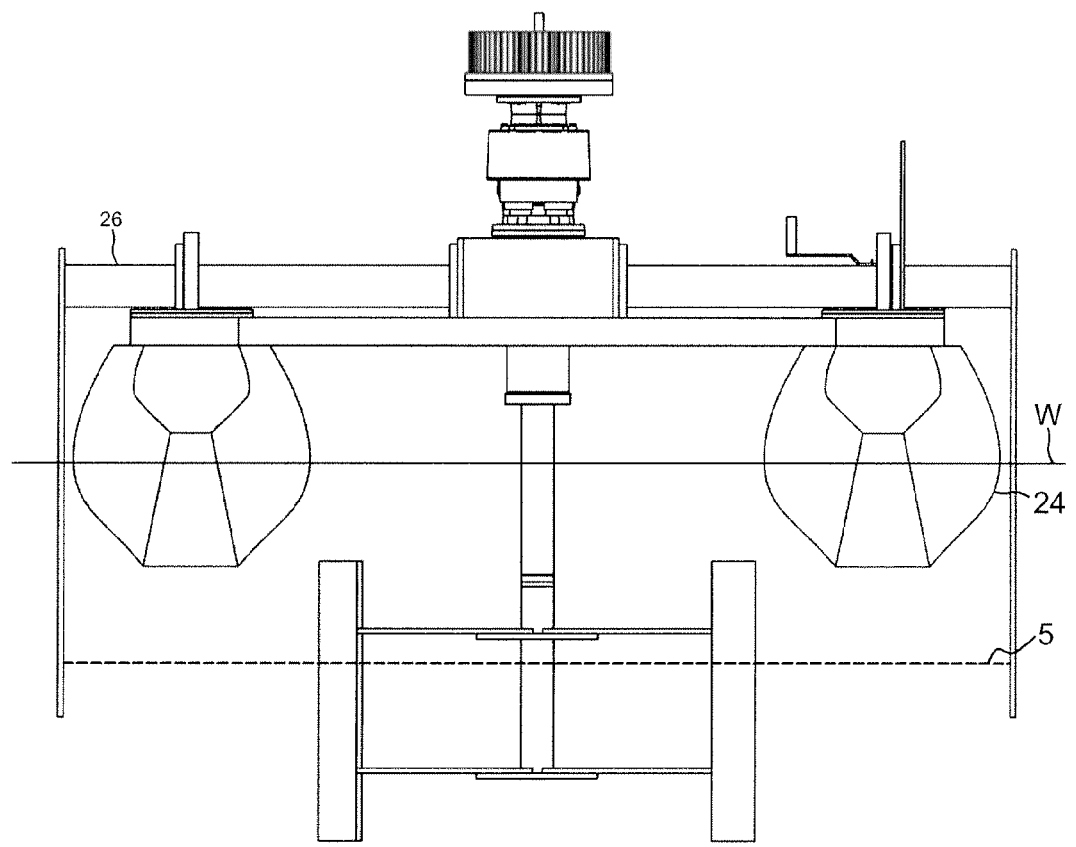
FIG. 3 is a front view of the invention in water.

The floating platform, as shown in FIG. 3, need only be capable of supporting the weight of the turbine mounting assembly 22. The buoyancy means 24 may therefore be created in accordance with the weight of the turbine assembly to be supported thereby. When positioned in water, the support structure 26 may remain above the water line W, while the buoyancy means 24 may be partially submerged in the water. The turbine rotor 20 may be fully submerged.

Figure 4:
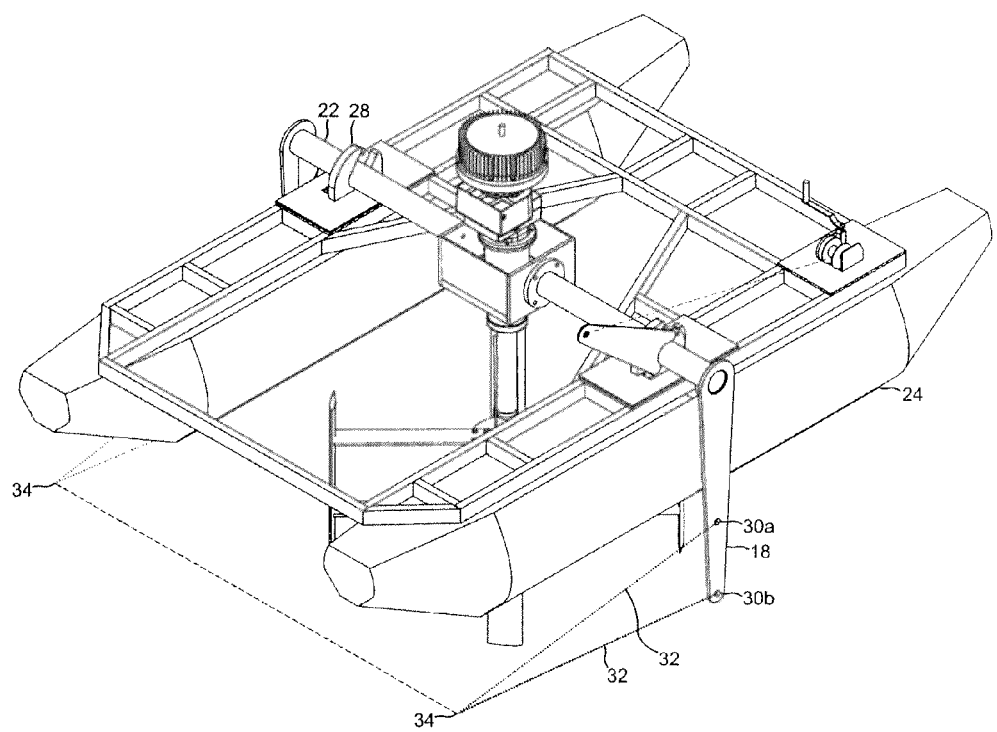
FIG. 4 is a view of the invention showing holding member attachments.

Additionally, the lower arms 18 may extend beyond the moment center as shown in FIG. 4. At least two attachment zones 30a, 30b may be included in each lower arm 18. One attachment zone 30a may be positioned above the moment center, and another attachment zone 30b may be positioned below the moment center 5. Holding members 32 may connect to the attachment means at one end and to a mooring point 34 at the other end, whereby the floating platform may be connected via the holding members 32 to a mooring point 34. In one embodiment of the present invention the mooring point 34 may be connected to an additional cable or line. The mooring point 34, or additional cable or line attached thereto, may be connected to an immovable object, such as, for example, a bridge or an anchor whereby the floating platform through its connection to this point may be held in a particular position in the water flow and keep the floating platform from drifting. A person skilled in the art will recognize that the floating platform may be connected via the holding members 32, which may be, for example, cables such as mooring cables, to a variety of mooring points 34.

Figure 5:
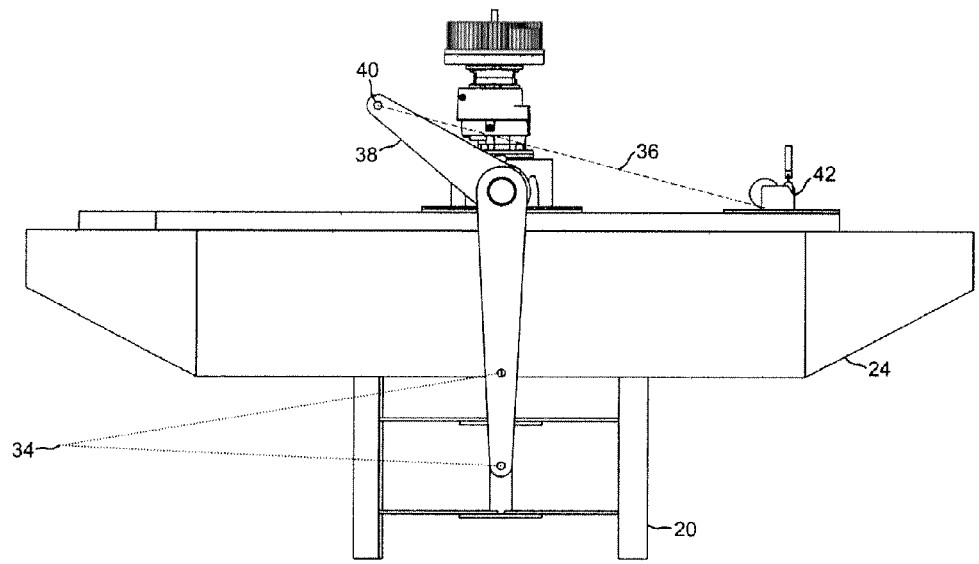
FIG. 5 is a side view of the invention with the turbine assembly in a vertical position.
Figure 6:
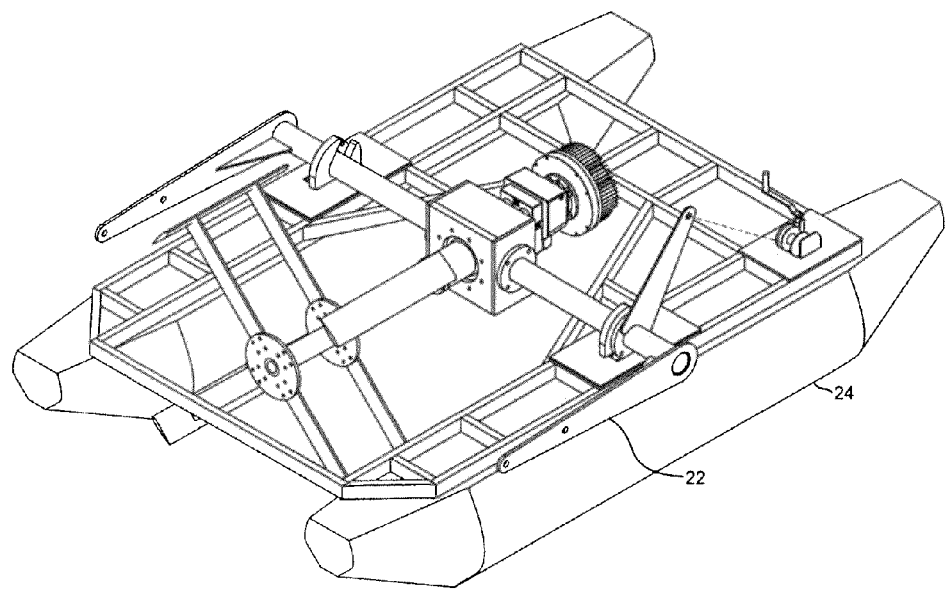
FIG. 6 is a view of the invention in transport position.

In one embodiment of the present invention the turbine mounting assembly 22 may be pivoted from a vertical position, whereby the turbine rotor extends below the buoyancy means 24, as shown in FIG. 5 to a horizontal position as shown in FIG. 6.

The pivoting means whereby the turbine assembly 22 is moved between vertical and horizontal positions may be of the type shown in FIG. 5. A pivoting line 36 may be attached to the at least one upper arm 16. As shown in FIG. 5 this connection to the upper arm may be by way of a flange 38 extending at an angle from the upper arm 16 having a flange attachment means 40 included therein whereby one end of the pivoting line 36 is attached to the flange 38. The other end of the pivoting line 36 is attached to a position adjustor 42, such as a means of adjusting tension, for example, such as a crank shaft. A skilled reader will recognize that other position adjustors may be applied in embodiments of the present invention. One embodiment of the present invention may include a position adjustor 42 that functions so as to increase and decrease the tension of the pivoting line 36. So that when the tension in the pivoting line is decreased the turbine assembly may be positioned substantially vertically. Whereas, when the tension in the pivoting line is increased the turbine assembly may pivot towards a substantially horizontal position. The position adjustor 42 may be capable of securing the pivoting line 36 in a particular position, for example this may be achieved by altering the tension in the pivoting line 36 and holding that state of tension over time, whereby the turbine assembly may be securely held in a vertical position, a horizontal position, or somewhere in between these position for a period of time.

Figure 7:
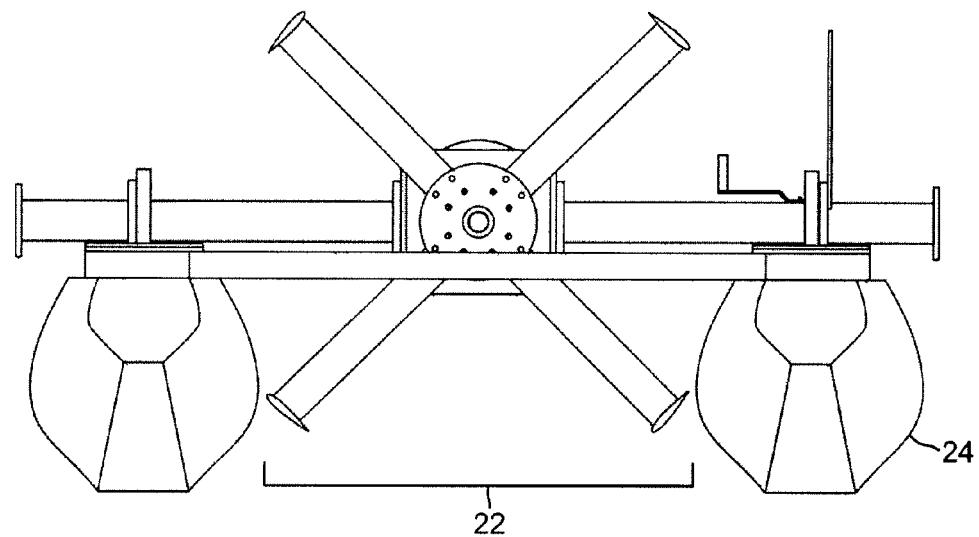
FIG. 7 is a front view of the invention in transport position.
Figure 8:
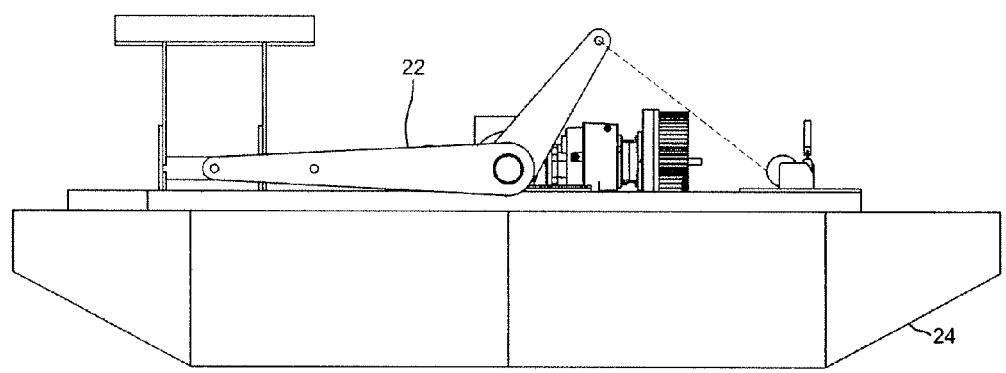
FIG. 8 is a side view of the invention in transport position.

In one embodiment of the present invention, the turbine assembly positioned in horizontally, as shown in FIGS. 6-8 is capable of being transported between locations. Such transportation may be effected by way of a trailer (not shown).

Figure 9:
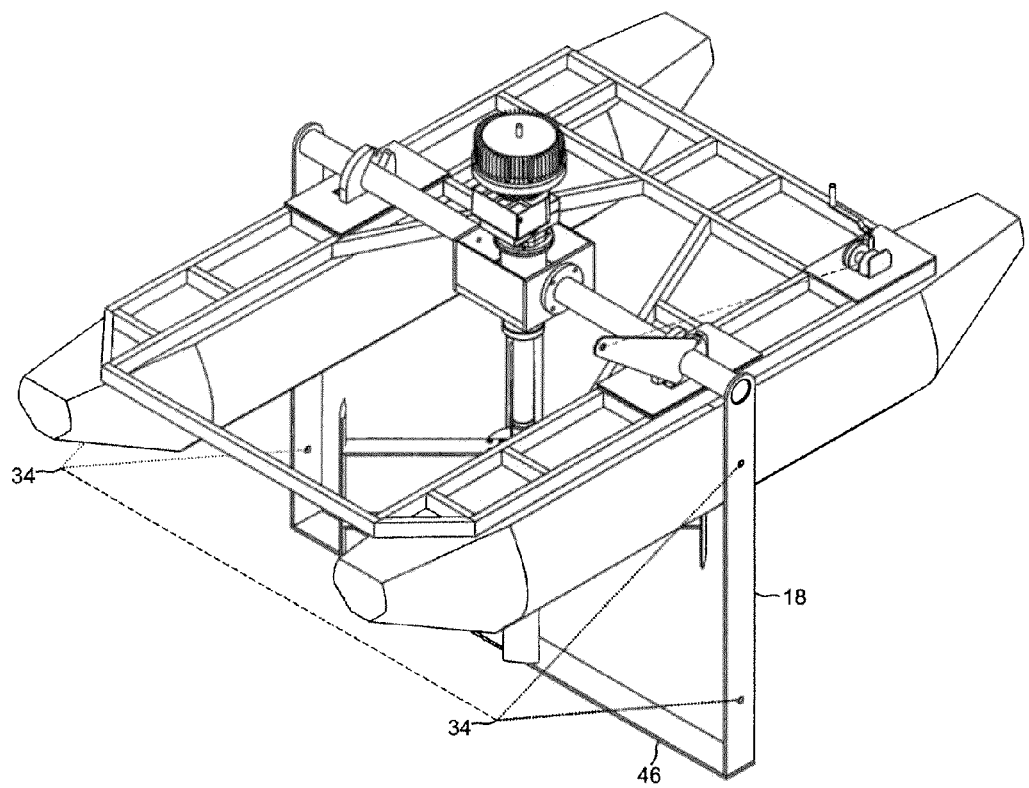
FIG. 9 is a view of an embodiment of the invention including a bottom bearing.
Figure 10:
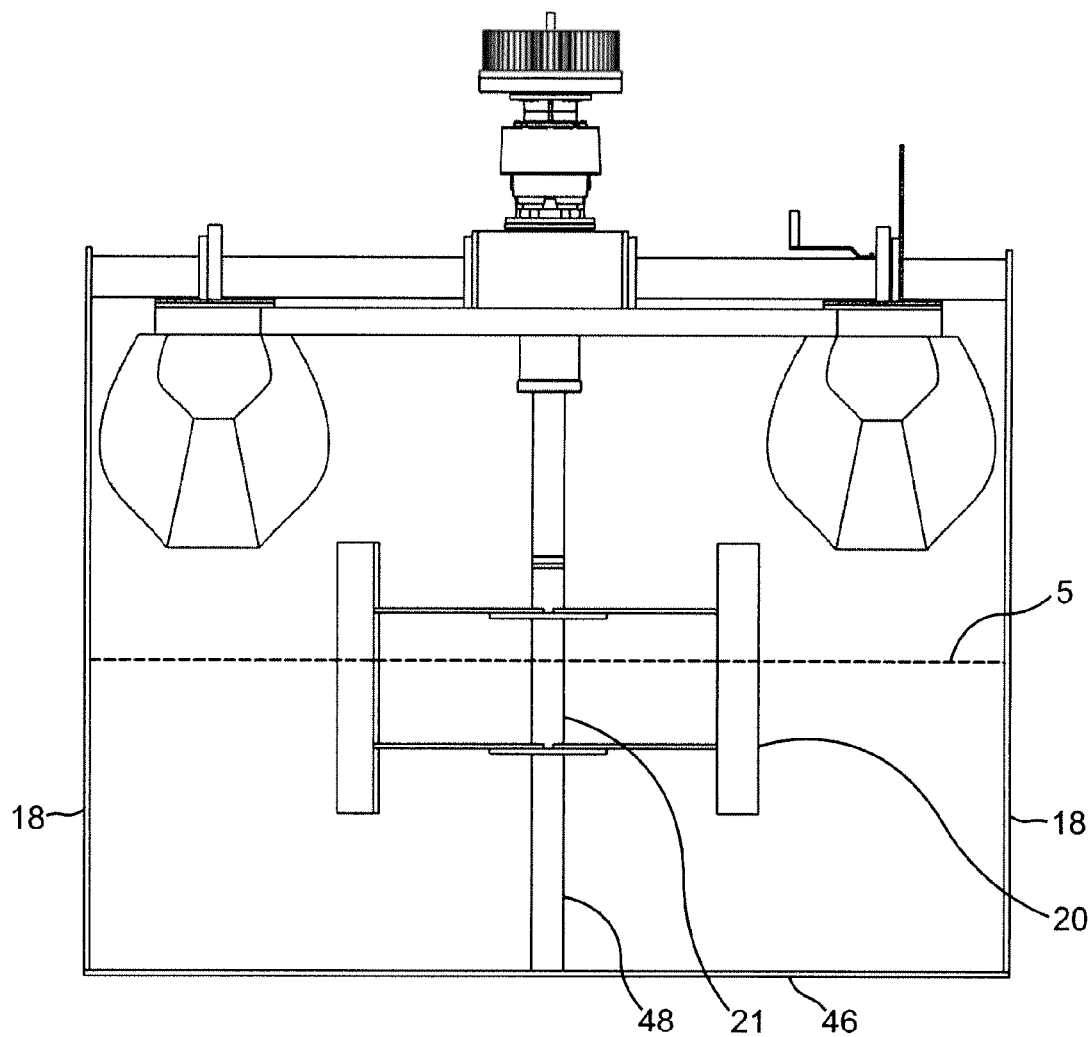
FIG. 10 is a front view of an embodiment of the invention including a bottom bearing.

In another embodiment of the present invention, a bottom bearing 46 may be attached to the lower arms 18 whereby the bottom bearing extends between the lower arms, as shown in FIGS. 9 and 10. When the turbine mounting assembly 22 is positioned vertically, the bottom bearing 46 is below the turbine rotor 20 to allow for the rotor to be able to rotate without interference from the bottom bearing. Additionally, the bottom bearing 46 may hold the turbine rotor 20 in a substantially vertical position, as shown in FIG. 10. A bottom shaft 48 may be connected to the turbine rotor 20, for example by way of a connection between the upper end of the bottom shaft 48 and a turbine rotor shaft 21. The lower end of the bottom shaft 48 may be connected to the bottom bearing 46. The turbine rotor 20 may consequently rotate around the rotor shaft 21 in a manner whereby the position of the rotation is maintained in accordance with the point of connection of the bottom shaft 48 with the bottom bearing 46, so that the turbine rotor 20 rotates around the point of connection.

Figure 11:
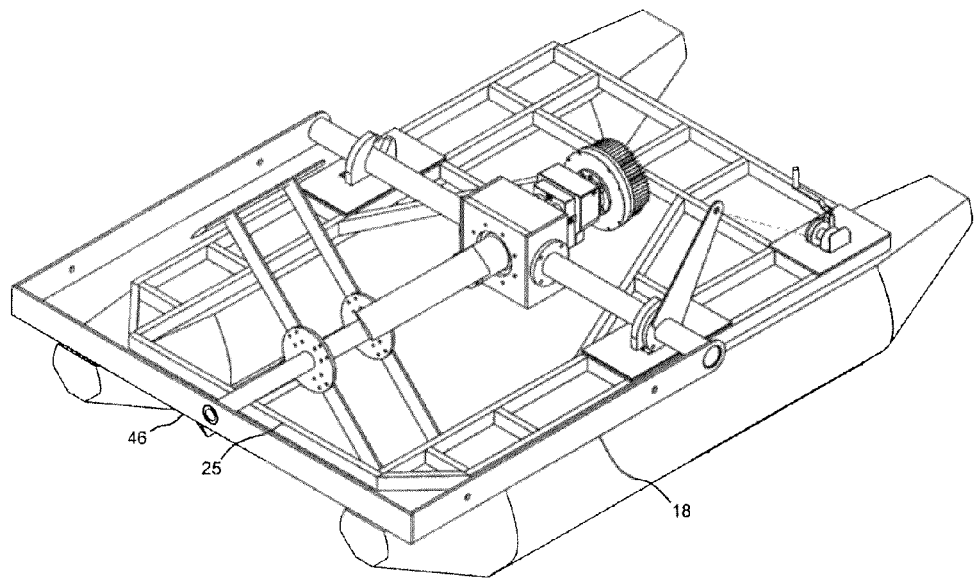
FIG. 11 is a view of an embodiment of the invention including a bottom bearing in transport position.

The bottom bearing 46 may further include an attachment whereby a mooring cable may be connected between the bottom bearing 46 and a mooring point below the floating platform (not shown). Additionally, the bottom bearing may be positioned sufficiently below the turbine rotor 20 so that when it is pivoted to a horizontal position it may clear the front of the buoyancy means 24, as shown in FIG. 11. A front cross-member 25 may be detachable from the support structure 26 of the floating platform. The front cross-member 25 may be detached to facilitate the pivoting of the turbine assembly whereby the bottom shaft 48 may pass through the support structure 26 when the turbine mounting assembly is pivoted to a horizontal position. The front-cross member 25 may be reattached after the pivoting is complete and the turbine assembly is positioned horizontally. Reattaching the front-cross member 25 allows for all of the pieces of the floating platform to be intact during the transport of the floating platform.

Figure 12:
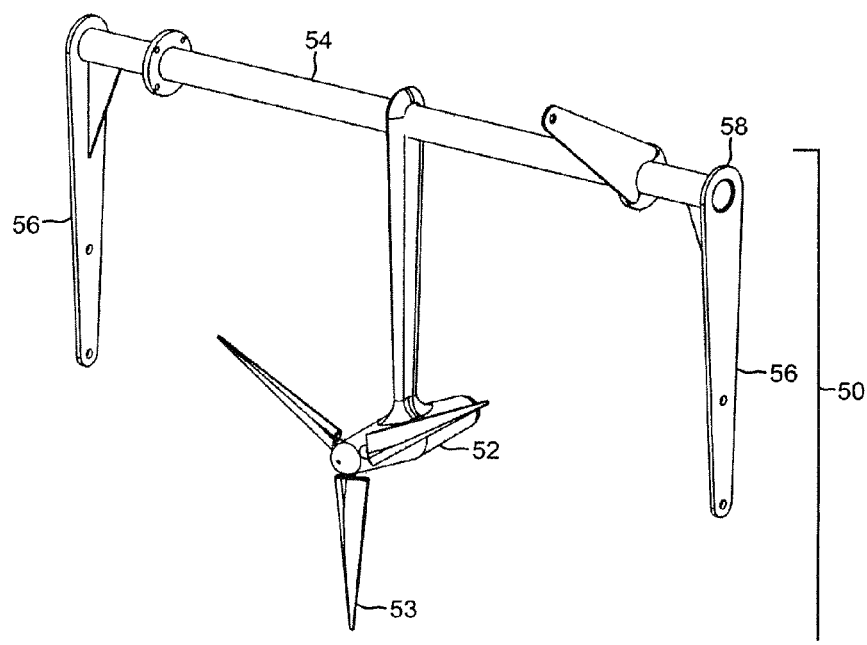
FIG. 12 is a view of a horizontal axis turbine assembly.

In yet another embodiment of the present in invention, as shown in FIG. 12, a horizontal axis turbine mounting assembly 50 may be utilized to mount a horizontal axis turbine 52 having a horizontal axis turbine rotor 53. The horizontal axis turbine mounting assembly 50 may be formed of an upper arm 54 capable of holding a horizontal axis turbine 52 extended downward vertically therefrom. Lower arms 56 may extend vertically downward from each end of the upper arm 54. A pivoting cradle 58 may be included at the connection of the upper arm 54 and at least one lower arm 56. The pivoting cradle 58 permits movement and pivoting of the horizontal axis turbine mounting assembly 50, whereby the horizontal axis turbine 52 is not held in a rigid position.

Figure 13:
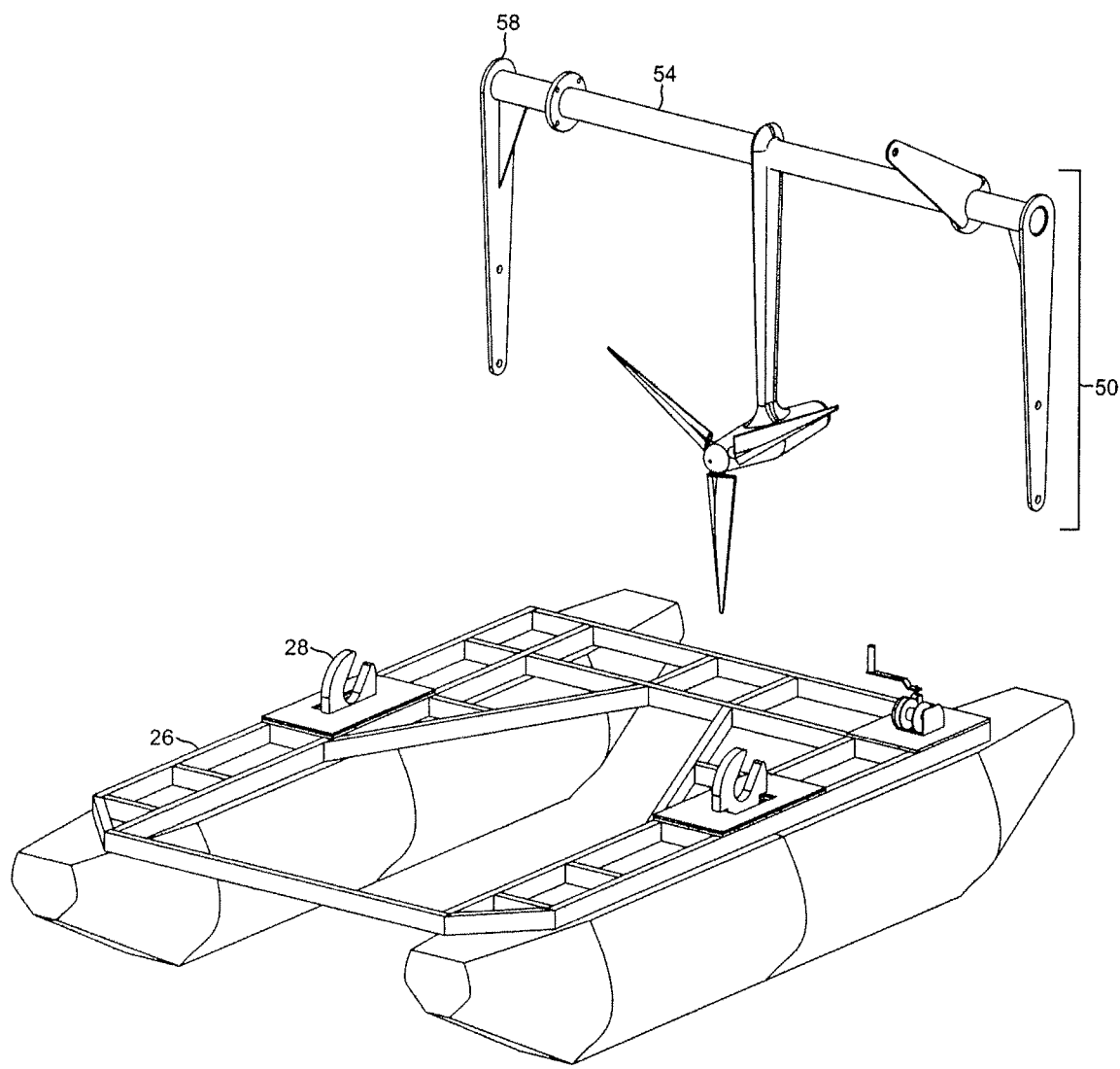
FIG. 13 is an exploded view of an embodiment of the floating turbine assembly of the invention including a horizontal axis turbine.
Figure 14:
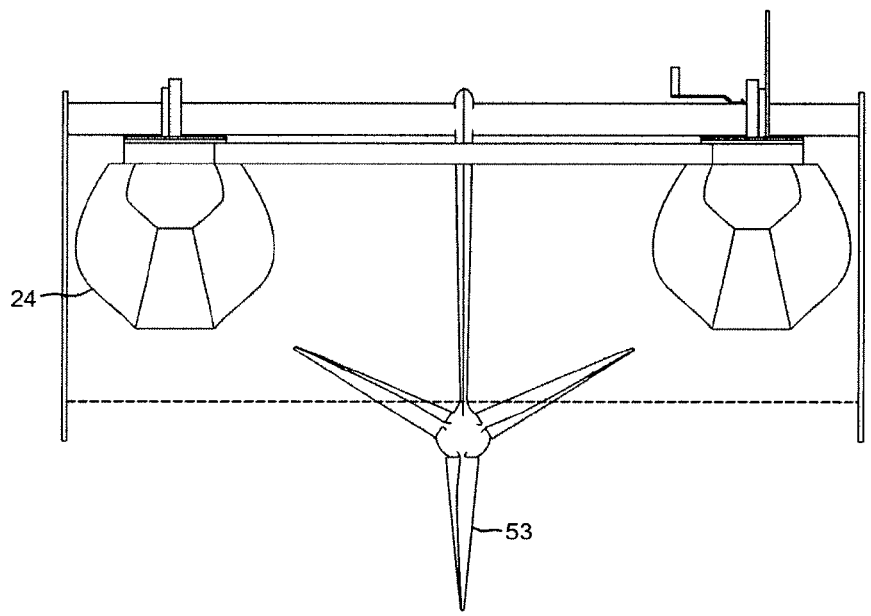
FIG. 14 is a front view of an embodiment of the invention including a horizontal axis turbine.

The horizontal axis turbine mounting assembly 50 may be positioned upon the floating platform whereby it is detachably fixed to the support structure 26, by way of attachment means 28 that is capable of supporting the upper arm 54 of the horizontal axis turbine assembly 50, as shown in FIG. 13. When so attached, as shown in FIG. 14, the buoyancy means 24 need be capable of supporting the weight of the horizontal axis turbine assembly 50. The horizontal axis turbine rotors 53 may be horizontally positioned.

Figure 15:
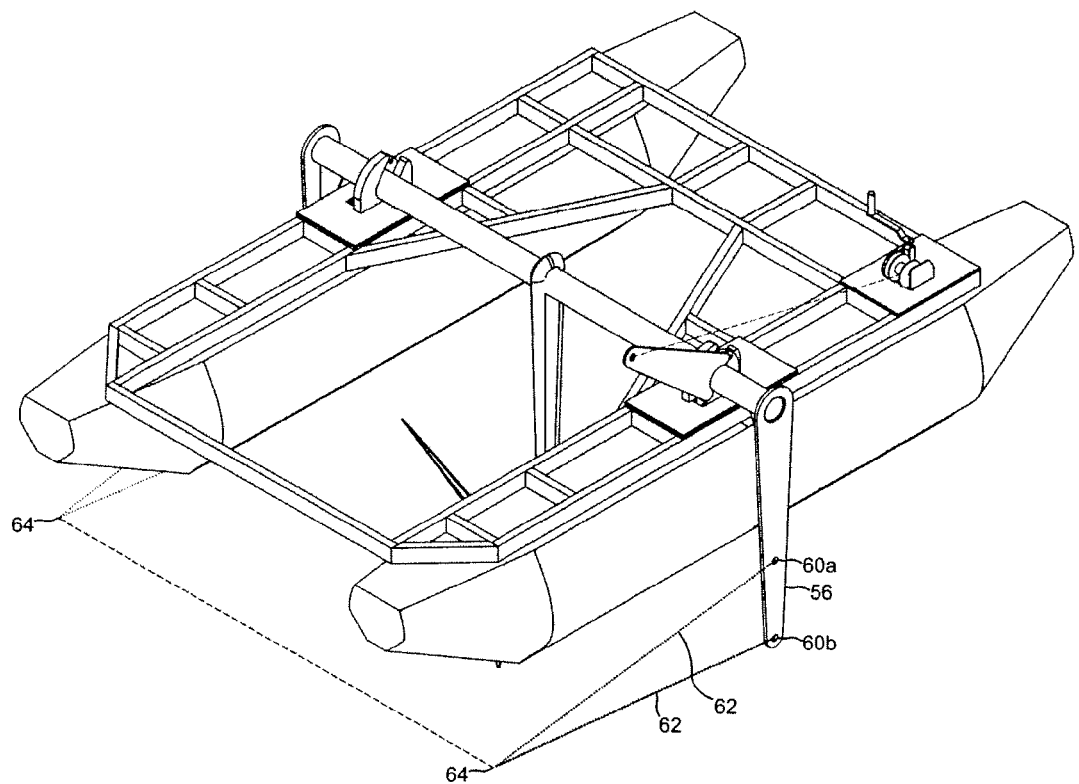
FIG. 15 is a view of an embodiment of the invention including a horizontal axis turbine assembly in a vertical position.

Each lower arm 56 of the horizontal axis turbine mounting assembly may include at least two attachment zone 60a and 60b, as shown in FIG. 15, whereby holding members 62 may be connected to the lower arm 56 by way of the attachment zones 60a and 60b in either a fixable or detachable manner. One attachment zone 60a may be positioned in the lower 56 above the moment center and another 60b may be positioned in the lower arm 56 below the moment center. The other end of the holding members 62 may be attached to a mooring point 64. The holding members may be, for example, cables, such as mooring cables. The mooring point may be an immovable object, such as, for example, a bridge or an anchor whereby the floating platform through its connection to this point may be held in a particular position in the water flow and keep the floating platform from drifting. A person skilled in the art will recognize that the floating platform may be connected via the holding members 62 to a variety of mooring points 64.

Figure 16:
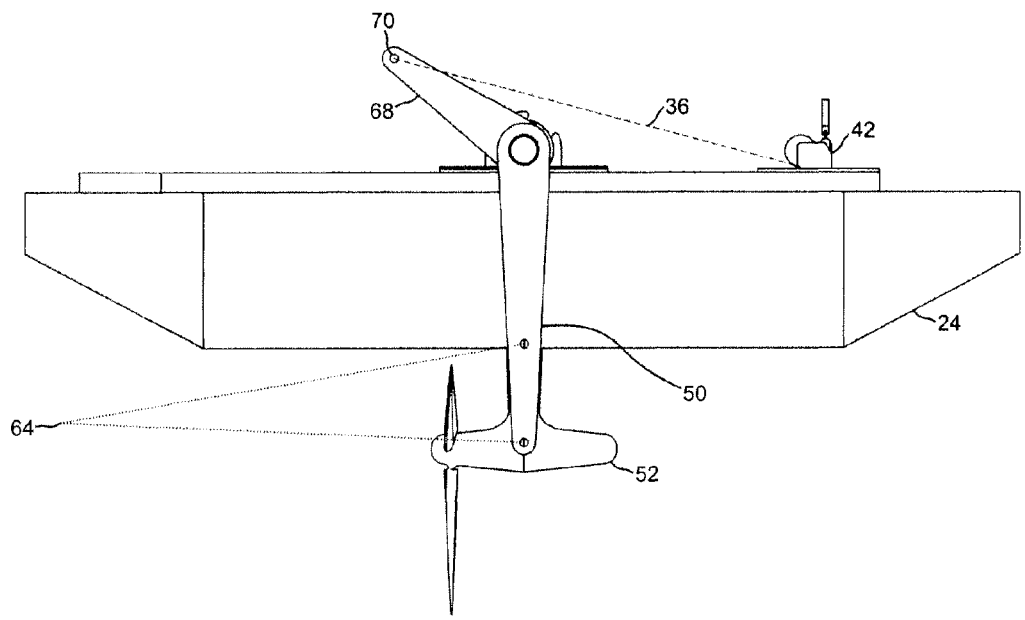
FIG. 16 is a side view of an embodiment of the invention including a horizontal axis turbine in a vertical position.
Figure 17:
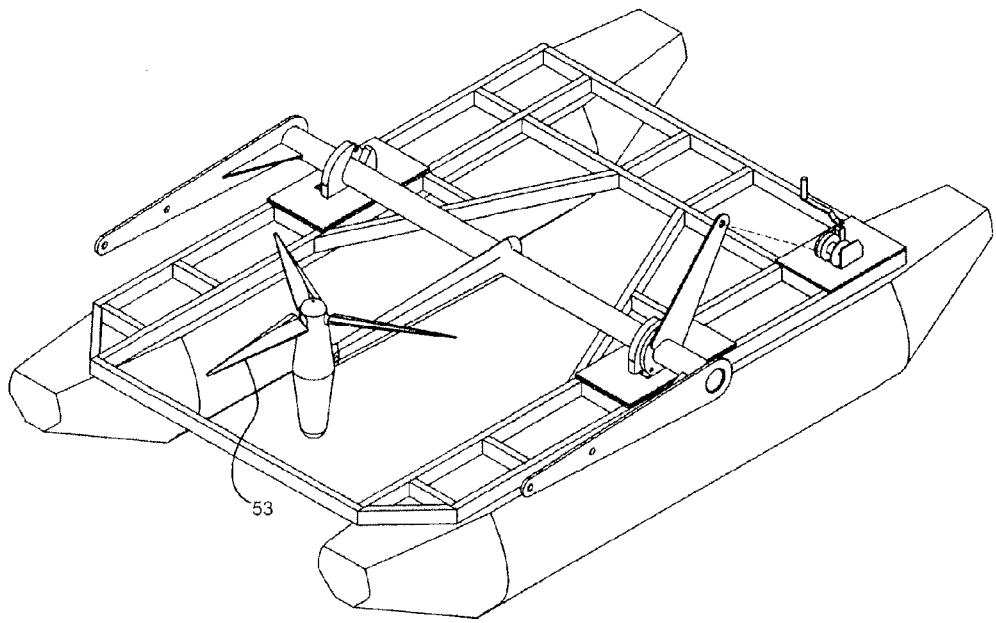
FIG. 17 is a view of an embodiment of the invention including a horizontal axis turbine in transport position.

The turbine mounting assembly 50 may be pivoted from a vertical position, whereby the horizontal axis turbine 52 extends below the buoyancy means 24, as shown in FIG. 16 to a horizontal position as shown in FIG. 17. The pivoting means whereby the horizontal axis turbine mounting assembly 50 is moved between vertical and horizontal positions may be of the type shown in FIG. 16. A pivoting line 36 may be attached to the upper arm of the horizontal axis turbine mounting assembly. As shown in FIG. 16 this connection to the upper arm may be by way of a horizontal axis turbine assembly flange 68 extending at an angle from the horizontal turbine assembly upper arm having a horizontal axis turbine assembly flange attachment means 70 included therein whereby one end of the pivoting line 36 is attached to the horizontal axis turbine assembly flange 70. The other end of the pivoting line 36 is attached to a position adjustor 42, for example, a tension adjustor, such as a crank shaft. A skilled reader will recognize that other position adjustors may be applied in embodiments of the present invention. The position adjustor 42 may function so as to increase and decrease the tension of the pivoting line 36. So that when the tension is the pivoting line is decreased the turbine assembly may be positioned substantially vertically. Whereas, when the tension in the pivoting line is increased the horizontal axis turbine mounting assembly 50 may pivot towards a substantially horizontal position. The position adjustor 42 may be capable of securing the pivoting line 36 to cause the horizontal axis turbine mounting assembly 50 to be held in a particular position for a period of time. One embodiment of the present invention applies a tension adjustor to create a state of tension in the pivoting line 36 and hold that state of tension over time, whereby the turbine assembly may be securely held in a vertical position, a horizontal position, or a position in between horizontal and vertical, for a period of time.

Figure 18:
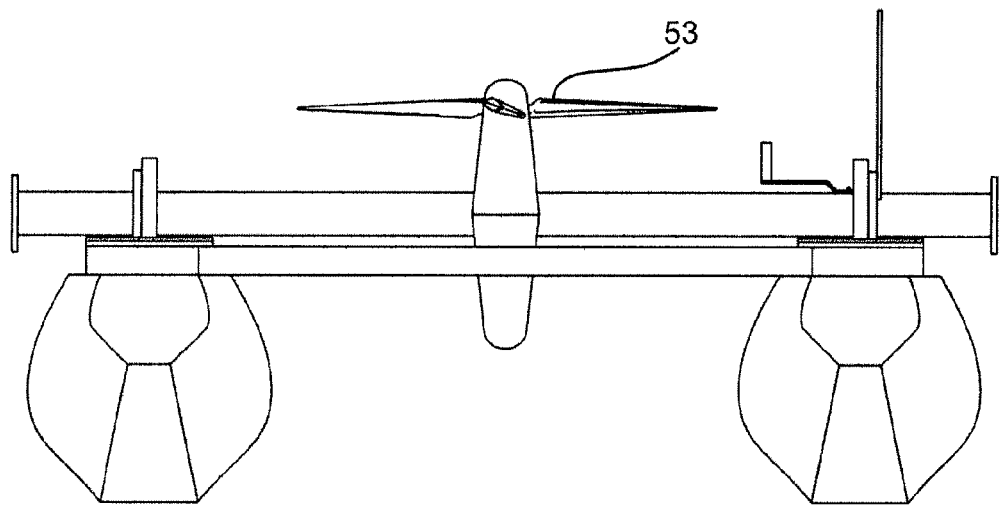
FIG. 18 is a front view of an embodiment of the invention including a horizontal axis turbine in transport position.
Figure 19:
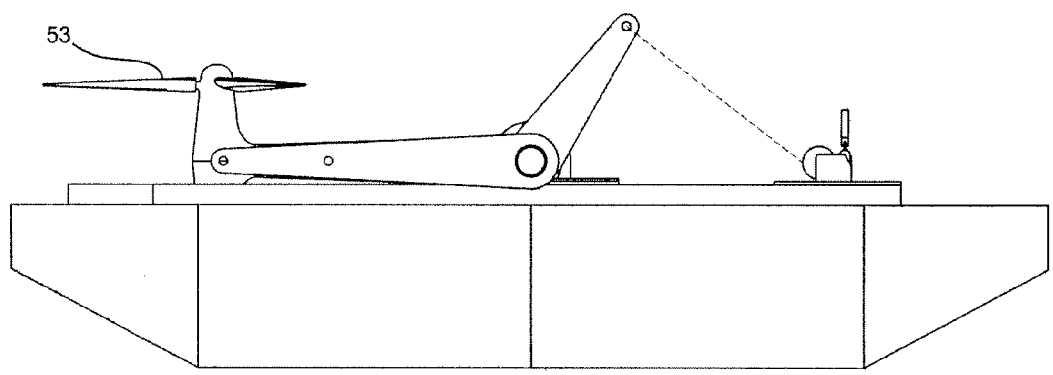
FIG. 19 is a side view of an embodiment of the invention including a horizontal-axis turbine in transport position.

In one embodiment of the present invention, the turbine mounting assembly positioned in horizontally, as shown in FIGS. 17-19. The horizontal axis turbine rotors 53 may be positioned in a manner whereby the rotors are positioned above the support structure 26. In this position the present invention is capable of being transported between locations. Such transportation may be effected by way of a trailer (not shown).

The present invention is capable of achieving numerous benefits over the prior art. The pivoting cradle 14 permits moveability of the turbine mounting assembly 20 whereas the pivoting cradle 58 allows for moveability of the horizontal axis turbine mounting assembly 50. The incorporation of moveability of the turbine assembly in embodiments of the present invention have the benefit of lessening the torque on the turbine rotor 20 and horizontal axis turbine rotor 23. Rotors held in a rigid position have no means of averting torque, whereas turbine assemblies that facilitate moveability offer turbine rotors a means of averting excessive torque. This aversion further facilitates a diminished drag upon the present invention generally. In an embodiment of the present invention the pivoting cradle may be constructed so as to permit moveability of the turbine rotor where by such a rotor is virtually unaffected by drag.

Drag upon the present invention is further diminished by the position of the holding members. As shown in embodiments of the present invention, holding members may be attached to the floating platform by way of attachment means included in the lower arm of a turbine assembly or horizontal axis turbine assembly. The attachment means may be positioned above and below the moment center. This positioning may cause the cables to absorb drag that is exerted upon the floating platform in the prior art configurations. Such drag caused sections of prior art floating platforms, or the entirety of prior art floating platforms, to be pulled under the water line. The present invention is not so affected by drag. Thus, the present invention floating platform may enjoy increased stability and a virtually level surface as opposed to the prior art. Embodiments of the present invention may remain level under virtually all load conditions and no matter what the invention is moored to.

An additional benefit over the prior art is the ease whereby the present invention may be transported. The pivotable turbine mounting assembly and horizontal axis turbine mounting assembly facilitate this benefit. Permitting the movement of the turbine assemblies from a vertical working position to a horizontal traveling position causes embodiments of the present invention to be easily loaded upon a transport means, such as a trailer, a truck bed or other such vehicle.

Moreover, in one embodiment of the present invention, the size of the floating platform may be smaller than that required for prior art examples. In embodiments of the present invention the floating platform may need only be sufficiently large so as to support the weight of the turbine assembly. This has two benefits. First, a smaller floating platform is more economic to transfer, as it is less weighty and therefore does not require as much fuel to transport. Second, it may be small enough to be within the size and load requirements of transportation authorities set by regulations that impose transport permits requirements. Thus, the transport of embodiments of the present invention may not require a transport permit. This is an additional potential cost-saving aspect of the present invention.

The ability of the turbine mounting assembly to pivot creates a further benefit in that the present invention may be assembled on land. Embodiments of the present invention may be assembled directly into the horizontal traveling position. Thus, the turbine mounting assembly may be connected to the floating platform while the pieces of the present invention are on land, or even while on a transportation means. When the present invention is later transferred to water, the turbine assembly may be pivoted to the vertical position before it begins to function.

It will be appreciated by those skilled in the art that other variations of the embodiments described herein may also be practiced without departing from the scope of the invention. Other modifications are therefore possible. For example, additional types of turbines may be applied in the invention, and such turbines may require different forms of turbine assemblies to facilitate support of the turbine upon the floating platform. The present invention may be altered to apply non-water turbines, including wind turbines whereby the present invention may be configured to float upon a strong air current rather than water.

We claim:

1. A floatable turbine system, said floatable turbine system comprising:
    (a) a floatable platform for supporting a submerged turbine for generating power-from water flow;
    (b) a turbine mounting assembly for mounting the turbine to the floating platform, the turbine mounting assembly including a pivoting cradle that permits movement and pivoting of the turbine in the pivoting cradle in a direction of water flow;
    (c) a plurality of holding members for attaching to opposite sides of the turbine mounting assembly above and below a moment center of the floatable turbine system when the turbine is submerged under water.

2. The floatable turbine system of claim 1, wherein at least two holding members attach to one side of the turbine mounting assembly above and below a moment center under the water and at least two holding member attach to another opposite side of the turbine mounting assembly above and below the moment center under the water.

3. The floatable turbine system of claim 1, wherein said floatable turbine system further comprises pivoting means for pivoting the turbine mounting assembly between a substantially horizontal position that facilitates transport of the floatable turbine system and a substantially vertical position that facilitates power generation from the water flow.

4. The floatable turbine system of claim 3, wherein said turbine mounting assembly further comprises an upper arm and two lower arms extending from opposite ends of the upper arm.

5. The floatable turbine system of claim 4, wherein in the substantially vertical position the lower arms extend to a point in the water below the moment centre.

6. The floatable turbine system of claim 4, wherein said turbine mounting assembly is capable of holding a vertical axis turbine comprising a generator attached to a drive train and a turbine rotor, wherein the generator and drive train are positioned on opposite sides of the pivoting cradle to the turbine rotor, such that in the substantially vertical position of the turbine mounting assembly, the turbine rotor is submerged under water.

7. The floatable turbine system of claim 4, wherein said turbine mounting assembly is capable of holding a turbine having a horizontal axis turbine rotor, and said pivoting cradle is included at the connection between the upper arm and at least one lower arm.

8. The floatable turbine system of claim 4, wherein each lower arm includes at least two attachment means for connection to the holding members, wherein in the substantially vertical position of the turbine mounting assembly one attachment mean is positioned above the moment center, and the other attachment means is positioned below the moment center.

9. The floatable turbine system of claim 8, wherein one end of each holding member attach to one of the attachment means and another end of each holding member attach to a mooring point to keep the floating platform from drifting.

10. The floatable turbine system of claim 4, characterized in that said mounting assembly further comprises a bottom bearing extending between the lower arms.

11. The floatable turbine system of claim 10, wherein said bottom bearing further includes attachment means whereby a mooring cable may be connected between the bottom bearing and a mooring point below the floating platform.

12. The floatable turbine system of claim 4, wherein the floatable platform comprises a support structure whereby the turbine mounting assembly is supported, and buoyancy means positioned below the support structure.

13. The floatable turbine system of claim 12, wherein said support structure includes attachment means for holding the upper arms of the turbine mounting assembly.

14. The floatable turbine system of claim 12, wherein in the substantially vertical position of the turbine mounting assembly the turbine rotor extends below the buoyancy means.

15. The floatable turbine system of claim 1, wherein said holding members are cables.

16. The floatable turbine system of claim 1, wherein the floating platform is capable of supporting the weight of the turbine assembly.

17. The floatable turbine system of claim 1, wherein said water flow includes waves, tidal flow and current flow.

18. The floatable turbine system of claim 3, wherein the pivoting means comprises a pivoting line having one end connected to the upper arm and another end connected to a position adjustor capable of increasing or decreasing a tension on the pivoting line.

19. The floatable turbine system of claim 18, wherein the pivoting line is connected to the upper arm by way of a flange extending at an angle from the upper arm.

20. A floatable turbine system, said floatable turbine system comprising:
(a) a turbine mounting assembly for holding a turbine for generating power from water flow, the turbine mounting assembly including a pivoting cradle that permits movement and pivoting of the turbine, and an upper arm and two lower arms extending from opposite ends of the upper arm;
(b) a floatable platform for supporting said turbine mounting assembly; and
(c) at least four holding members for attaching to opposite sides of the turbine mounting assembly, wherein at least two of the four holding members attach to one side of the turbine mounting assembly above and below a moment center under the water and at least two of the four holding member attach to another opposite side of the turbine mounting assembly above and below the moment center under the water in a manner that resists water drag on the floatable platform.

* * * * *